(12) United States Patent
Mizushima

(10) Patent No.: US 8,084,912 B2
(45) Date of Patent: Dec. 27, 2011

(54) PLANETARY GEARED MOTOR AND DYNAMO

(75) Inventor: Yasuo Mizushima, Tokyo (JP)

(73) Assignee: Venera Laboratory Co., Ltd., Tokyo (JP)

( * ) Notice: Subject to any disclaimer, the term of this patent is extended or adjusted under 35 U.S.C. 154(b) by 529 days.

(21) Appl. No.: 12/279,094

(22) PCT Filed: Feb. 13, 2007

(86) PCT No.: PCT/JP2007/052908
§ 371 (c)(1),
(2), (4) Date: Aug. 12, 2008

(87) PCT Pub. No.: WO2007/094488
PCT Pub. Date: Aug. 23, 2007

(65) Prior Publication Data
US 2009/0058214 A1    Mar. 5, 2009

(30) Foreign Application Priority Data

Feb. 15, 2006  (JP) .................................. 2006-068324
Mar. 20, 2006  (JP) .................................. 2006-112662

(51) Int. Cl.
*H02K 23/26* (2006.01)
(52) U.S. Cl. ......... 310/203; 310/179; 310/208; 310/198
(58) Field of Classification Search .................... 310/83, 310/203, 179, 198, 208
See application file for complete search history.

(56) References Cited

U.S. PATENT DOCUMENTS

| 4,628,220 A | 12/1986 | Flogvall |
| 5,793,136 A * | 8/1998 | Redzic ........................... 310/114 |
| 6,175,178 B1 * | 1/2001 | Tupper et al. ................. 310/166 |

FOREIGN PATENT DOCUMENTS

| JP | 9-93895 | 4/1997 |
| JP | 09093895 A * | 4/1997 |
| JP | 9-175199 | 7/1997 |
| JP | 11-113229 | 4/1999 |
| JP | 2000-184627 | 6/2000 |
| JP | 2001-5425 | 1/2001 |
| JP | 2003-314634 A1 | 11/2003 |
| WO | WO 00/21183 A1 | 4/2000 |

OTHER PUBLICATIONS

International Search Report for International Application PCT/JP2007/052908 dated May 15, 2007.

* cited by examiner

*Primary Examiner* — Quyen Leung
*Assistant Examiner* — Leda Pham
(74) *Attorney, Agent, or Firm* — Kratz, Quintos & Hanson, LLP

(57) ABSTRACT

Provided is a DC motor capable of eliminating a DC current reverse rectification performed in a conventional DC motor and enabling rotation of maximum torque at all rotation angle and having a shape and a function for facilitating a combination with a speed change gear mechanism. Also provided is a planetary gear dynamo using the shape and the function of the present invention and capable of reducing inverse torque when the function is used as a generator.

8 Claims, 9 Drawing Sheets

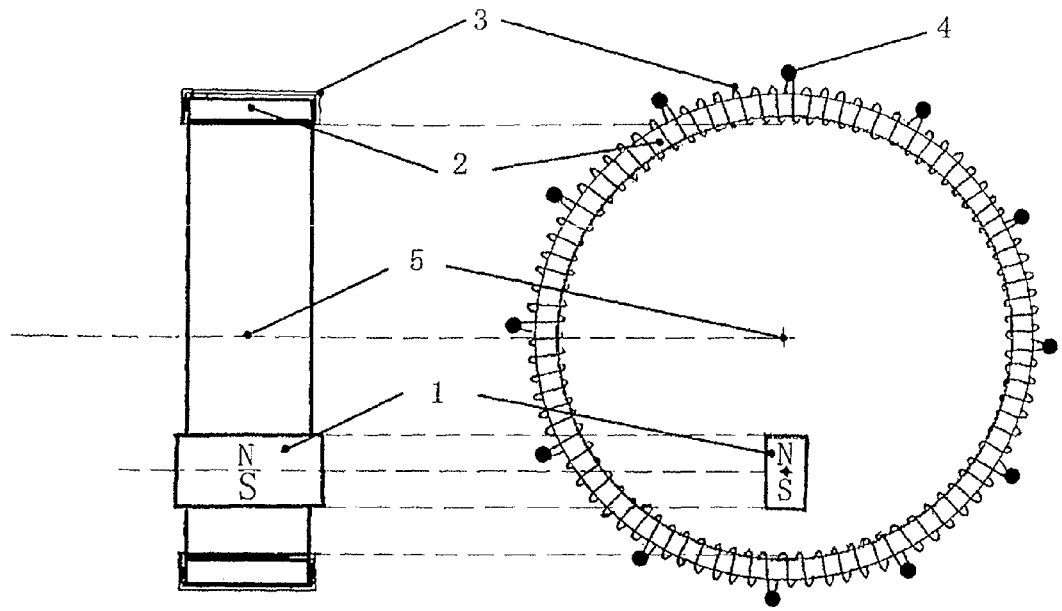
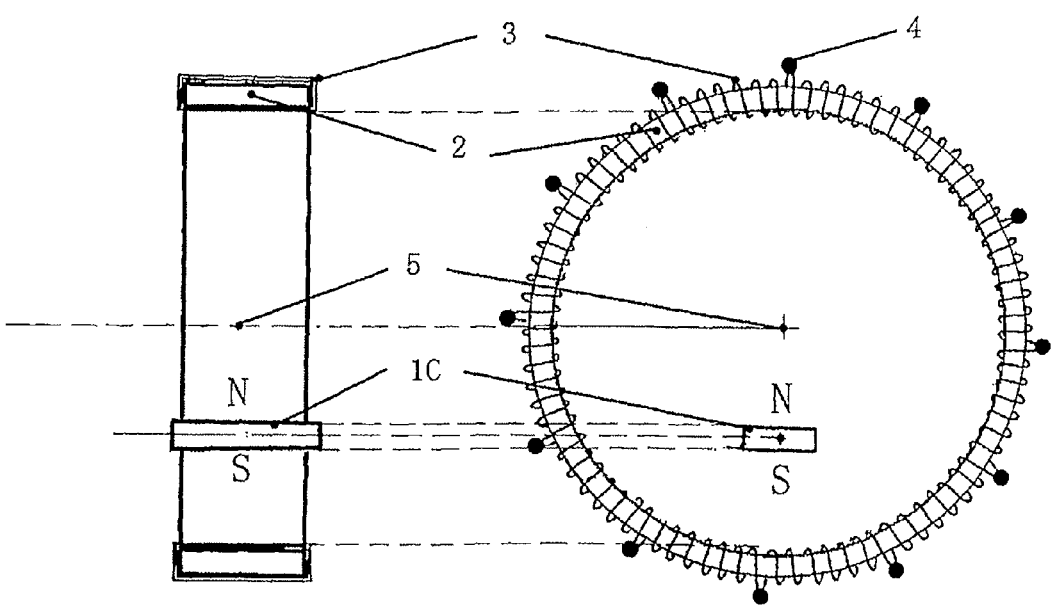

US 8,084,912 B2

PLANETARY GEARED MOTOR AND DYNAMO

TECHNICAL FIELD

The present invention relates to a combination of a gear transmission mechanism and a DC motor, and more specifically provides an electric generator, which is most appropriate to be combined with a gear mechanism and in which reverse torque due to an armature reaction is reduced by utilizing a bipolar DC motor and a planetary gear mechanism having novel shapes, performances, and functions.

BACKGROUND ART

In conventional technology called a geared motor, a rotation shaft of a motor and a gear mechanism are connected, and housings thereof are secured to each other by screws, as shown in Japanese Unexamined Patent Publication No. 2001-5425.

Alternatively, a motor part and a gear mechanism part are arranged separately and connected by rotation shafts of a motor, and the motor part and the gear mechanism part are divided and held in one housing in the technology, as shown in Japanese Unexamined Patent Publication No. 2003-314634.

Since a permanent magnet of the motor part rotates such that a north pole and a south pole alternately approaches an iron core slot to cause a magnetic flux of the permanent magnet to pass through an iron core, a counter-electromotive force is generated in a coil in addition to cogging torque, whereby reverse torque is applied.

Since rotational force is generated by alternately switching the north pole and the south pole at both ends of the coil, it is necessary to reverse the direction of electric current flowing in the coil, whereby the coil generates a self-induced counter-electromotive force. The electric current flowing in the coil is interrupted at each reversal of the electric current, a high surge voltage is generated at each on/off thereof, and a stronger electromagnetic wave is generated with faster rotation. For each reverse rectification of the DC current, a dead point in which the rotation force is not generated is formed to cause uneven rotation and accordingly limit the starting position. The surge voltage, the cogging torque, and the dead point are causes of electromagnetic noise generated from an armature of a DC motor.

In the conventional motor, since the positional relation of a rotor and a stator is limited and fixed, a rotation shaft cannot be designed in a free position and angle inside a motor mechanism, whereby the function, shape, and connection application method of an entire mechanical device requiring rotational torque of the motor are accordingly limited.

As shown in Japanese Unexamined Patent Publication No. 2003-314634, the technology called the geared motor is a mechanism which adjusts the rotational speed of the motor to perform torque transmission for the purpose of adjusting the torque of the motor by varying the rotational speed with a combination of a motor rotation shaft and the gear mechanism in order to increase the torque, and accordingly requires a volume of both of the motor part and a gear part.

As shown in Japanese Unexamined Patent Publication No. 2005-287215, conventional technology called an electric generator utilizing a planetary gear utilizes a planetary gear mechanism as an increaser and has a purpose of increasing the induced voltage by increasing the rotational speed of the electric generator, whereby reverse torque due to an armature reaction as the rotational load of the electric generator increases in direct proportion to a speed rotational ratio in the case where an induced electromotive force is generated by applying electric current.

DISCLOSURE OF THE INVENTION

Technical Problems to be Solved

A first issue to be addressed by the present invention is to review the conventional relation of a rotor and a stator of a DC motor, realize a method of providing a gap, having a most efficient magnetic effect unique to the present invention for the rotor and the stator, as large as possible, and enable an arrangement of a mechanism such as a gear in the enlarged gap.

A second issue to be addressed by the present invention is to reshape a geared motor formed of two individual components of a motor and a gear mechanism connected by a rotation shaft of the motor, realize a gear mechanism in which one of the gears serves as a rotor, and compactify the motor and the gear mechanism into a single structure.

A third issue to be addressed by the present invention is to make use of the characteristic of the motor of the present invention, such that a free positional relation can be provided between the rotor and an armature in accordance with the arrangement, applied portion, and purpose of the motor, the position and angle of the rotation shaft can be varied freely without greatly influencing the rotation efficiency, and the motor can be designed freely to enable shifting of rotational speeds at a constant voltage and the like.

A fourth issue to be addressed by the present invention is the reduction of reverse torque in direct proportion to a speed increase ratio, which has not been achieved in a conventional electric generator utilizing a planetary gear mechanism.

Means to Solve the Problems

The present invention provides a simple structure which uses an armature, in which a toroidal coil is wound around a slotless annular iron core, to rotate a bipolar inner magnet rotor having a rotation diameter smaller than the inner diameter of the armature core at high speed.

Thus, there is a large gap between the rotor having the small rotation diameter and the annular armature. A mechanical device such as a gear formed of a nonmagnetic material can be provided by utilizing the gap.

In the case of a planetary gear decreaser/increaser as an example, providing a permanent magnet directly to a sun gear having a small rotation diameter allows the sun gear to be directly rotated at high speed as an inner rotor of a motor. Since the planetary gear serves a rotation function of the motor, a geared motor which takes up less space than a conventional geared motor by the size of a motor portion is provided.

The inner magnet rotor having the small rotation diameter of the present invention is not necessarily to be located in the center of an armature stator during rotation, and the position thereof and the angle of a rotation shaft may be changed constantly.

In the case where the rotation diameter is changed to the rotation shaft length direction of the inner magnet rotor, and the armature stator and the inner magnet rotor are relatively moved, the rotational speed thereof can be varied at a constant DC voltage.

In a method of rotating a bipolar DC motor of the present invention, two poles of a north pole and a south pole having rotation angles with respect to a bipolar magnet rotor are formed in the armature stator in 180 degrees diagonal positions, and a rotating magnetic field of the two poles is formed such that rotational torque is constantly generated with respect to the bipolar magnet rotor.

In the rotating method, a smooth rotation can be obtained starting from any position and without a dead point.

The toroidal coil is rotated by applying DC current through an input terminal, and, in this case, the DC current flows in the coil without changing the direction. That is, the coil is in a state where there is no on/off of the flowing electric current, whereby the occurrence of the surge voltage is eliminated and the occurrence of an electromagnetic wave is rare. Accordingly, the electromagnetic noise which has been generated from a coil of the conventional motor is extremely small.

Regarding the relation of the armature stator of the bipolar DC motor and the small inner magnet rotor having a large gap of the present invention, the shape of the armature stator may be an ellipse, a triangle, a quadrangle, or a polygon. The versatile motor in which arrangement places and design are not limited and which makes use of the characteristic of the present invention is provided as means to solve the problems.

A first aspect of the present invention provides a DC motor including an armature stator including a slotless annular iron core and even numbers of coils wound around an entire circumference of the annular iron core in an identical direction at equal intervals and rotation angles, the even numbers of coils being connected in series at both ends of all windings, and respective connection portions thereof being input terminals for electric power input, and a bipolar inner magnet rotor including a gap formed outside a rotation diameter between tips of magnetic poles and inside an inner circumference of the annular iron core and a magnetic field of a bar-shaped magnet or a magnetic field of a plate-shaped magnet orthogonal to a rotation shaft, wherein a DC voltage is applied to one of the input terminals of the armature stator and the input terminal in a position 180 degrees diagonal therefrom in accordance with a rotation of the bipolar inner magnet rotor in a sequential and continuous manner in a rotational direction.

In the DC motor, a shape of the slotless annular iron core of the armature stator may be a circle shape, an ellipsis shape, a triangle shape, a quadrangle shape, or a polygon shape.

In the DC motor, the rotation shaft of the bipolar inner magnet rotor may be eccentric with respect to a center of the shape of the slotless annular iron core.

In the DC motor, the rotation diameter between tips of the magnetic poles of the bipolar inner magnet rotor may be changed to a rotation shaft length direction thereof.

In the DC motor, a ratio of a rotation magnetic pole diameter of the bipolar inner magnet rotor and an inner diameter of the slotless annular iron core may be less than or equal to 61.80339%.

In the DC motor, a planetary gear mechanism may be provided in the gap between the armature stator and the bipolar inner magnet rotor.

In the DC motor, the planetary gear mechanism may include a sun gear, a planetary gear meshing with the sun gear on an outer side of the sun gear, and an internal gear encompassing the planetary gear to mesh with the planetary gear, the internal gear being concentrically provided with the armature stator on an outer circumference or a side surface, and the planetary gear being integrally provided with the bipolar inner magnet rotor internally or being integrally provided with the bipolar inner magnet rotor on a side surface or including the bipolar inner magnet rotor.

An electric generator includes a magnet rotor provided to the sun gear, a coil opposing magnetic poles of the magnet rotor is provided to the planetary gear carrier such that the coil is arranged to be secured to the planetary gear carrier which is rotated by an orbit of a rotation shaft of the planetary gear, and electromotive force is generated in the coil by rotating the planetary gear carrier to rotate the magnet rotor provided to the sun gear.

BRIEF DESCRIPTION OF DRAWINGS

FIG. 11 shows views of the arrangement and type of the bipolar inner magnet rotor of the present invention, the left side showing a side view and the right side showing a front view.

FIG. 12 shows views of the arrangement and type of the bipolar inner magnet rotor of the present invention, the left side showing a side view and the right side showing a front view.

Figure 1:
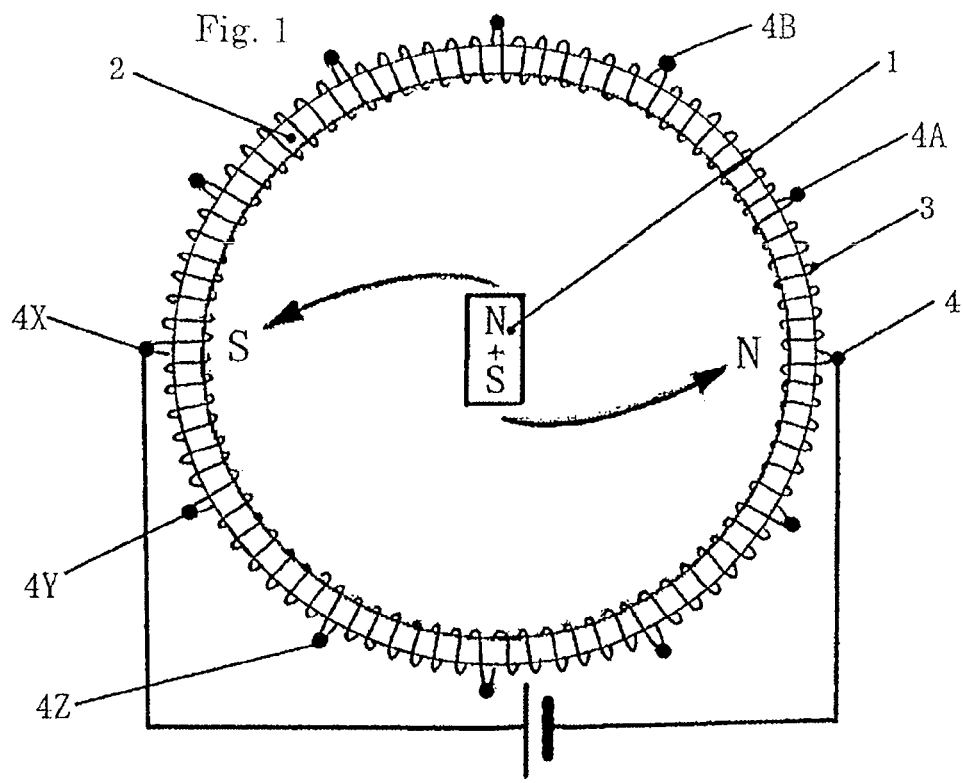
FIG. 1 is a view showing the operation of a bipolar DC motor of the present invention.

BRIEF DESCRIPTION OF NUMERALS 1, 1A, 1B, 1C, and 1D: Bipolar inner magnet rotor
2: Annular iron core
3: Toroidal coil
4, 4A, 4B, 4C, 4X, 4Y, and 4Z: Terminal
5: Center
6: Sun gear
7: Planetary gear
8: Internal gear
9: Planetary gear shaft
10: Carrier
11: Rotation shaft

BEST MODE FOR CARRYING OUT THE INVENTION

FIG. 1 is a view showing the relation of an armature stator and a magnet rotor of a bipolar DC motor which forms the basis of the present invention. Twelve layer-wound toroidal coils 3 are arranged at equal intervals around the entire circumference of a slotless annular iron core 2, and are respectively connected in series. The closed annular toroidal coil 3 is formed with the connection part thereof as an input terminal 4 of electric power.

Regarding the generation of rotational torque, DC voltage is applied to one of the input terminals of the armature stator, which is in a range where the rotation angle is in the rotational direction with respect to magnetic poles of a magnetic field of a magnet orthogonal to a rotation shaft of a bipolar inner magnet rotor 1, among the input terminals at the plurality of connection portions of the toroidal coil 3, i.e., an input terminal 4 and to an input terminal 4X in the 180 degrees diagonal position in the drawing, and is sequentially applied in a continuous manner to input terminals 4A and 4Y, input terminals 4B and 4Z, etc., located in the rotational direction in accordance with the rotation of the bipolar inner magnet rotor 1, whereby a rotational magnetic field having two poles in 180 degrees diagonal positions is generated in the armature stator by DC current for the rotation.

Figure 2:
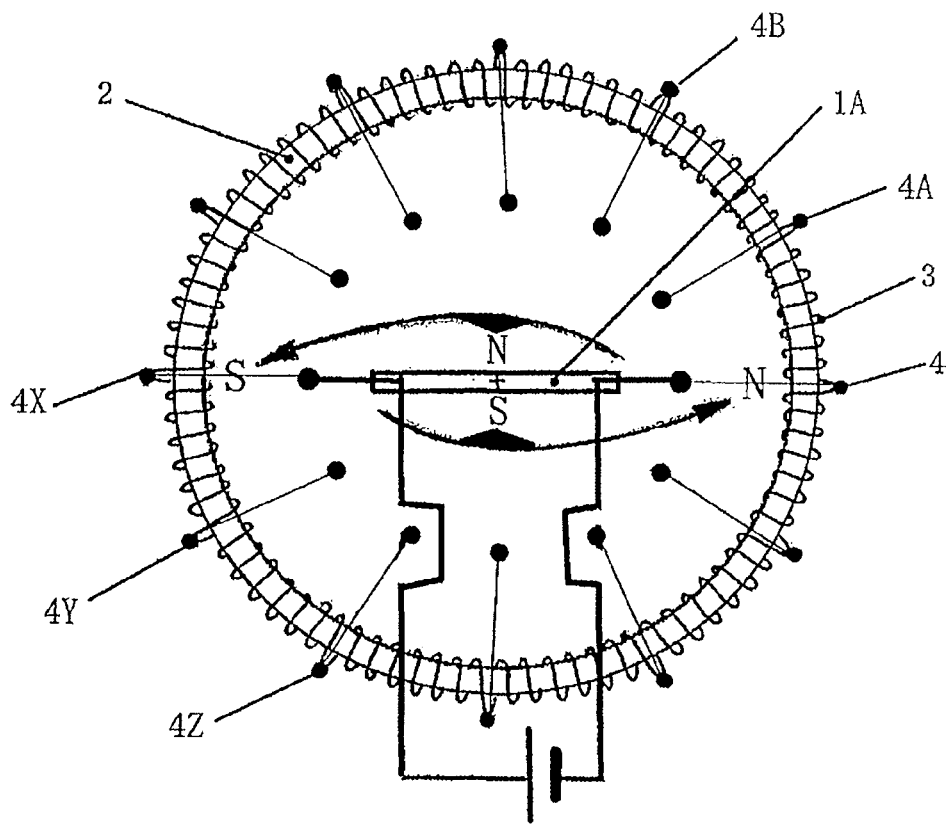
FIG. 2 is a complementary illustrative view of FIG. 1.

FIG. 2 shows the generation of the rotational torque by a bipolar inner magnet rotor 1A having a magnetic field of a plate-shaped permanent magnet. In order to clarify a method of inputting to the toroidal coil 3, a state where the input is performed with respect to the input terminal 4 and the input terminal 4X via contact points while the bipolar inner magnet rotor 1A is connected to a power supply is depicted in the drawing as an example.

The power supply is a DC power supply, and the input terminal 4X and the input terminal 4 are respectively applied with a positive voltage and a negative voltage. The DC electric current diverges to the left and right from the input terminal 4X to flow in a right-handed spiral and a left-handed spiral up to the input terminal 4 in the closed toroidal coil 3, which is wound around the entire circumference in the same direction, and then is grounded to the power supply.

The slotless annular iron core 2 serves an electromagnet, which is halved at the positions of the input terminal 4X and the input terminal 4 and in which corresponding polarities face each other in half-arc shapes, whereby the north pole and the south pole are formed diagonally, the leakage flux is combined with the magnetic pole of the bipolar inner magnet rotor 1A, and the torque for a left rotation is generated for the bipolar inner magnet rotor 1A in the drawing.

The rotation angle of the bipolar inner magnet rotor 1A is 90 degrees in the drawing, but the input positions are switched to the next input terminals 4Y and 4A in the rotational direction at a rotation angle of 30 degrees. At this time, the bipolar inner magnet rotor 1A continues the rotation in a range of a 30-degree rotation angle until the next input is performed for input terminals 4Z and 4B, while maintaining the rotational torque corresponding to a rotation angle of 90 degrees to 60 degrees.

That is, there is no dead point in the rotational torque generated by the toroidal coil 3 of the armature stator with respect to the bipolar inner magnet rotor 1A. During the rotation, the flow of the DC electric current in the toroidal coil 3 of the armature stator is made continuous, simultaneously with the rotation being performed extremely smoothly with the torque being maintained approximately constant in one direction. Thus, the surge voltage due to the on/off of the voltage of the toroidal coil 3 does not occur.

This method of generating the rotational torque may be performed by a brush commutator, or may be performed by a rotational position detection sensor and an electronic relay.

Figure 3:
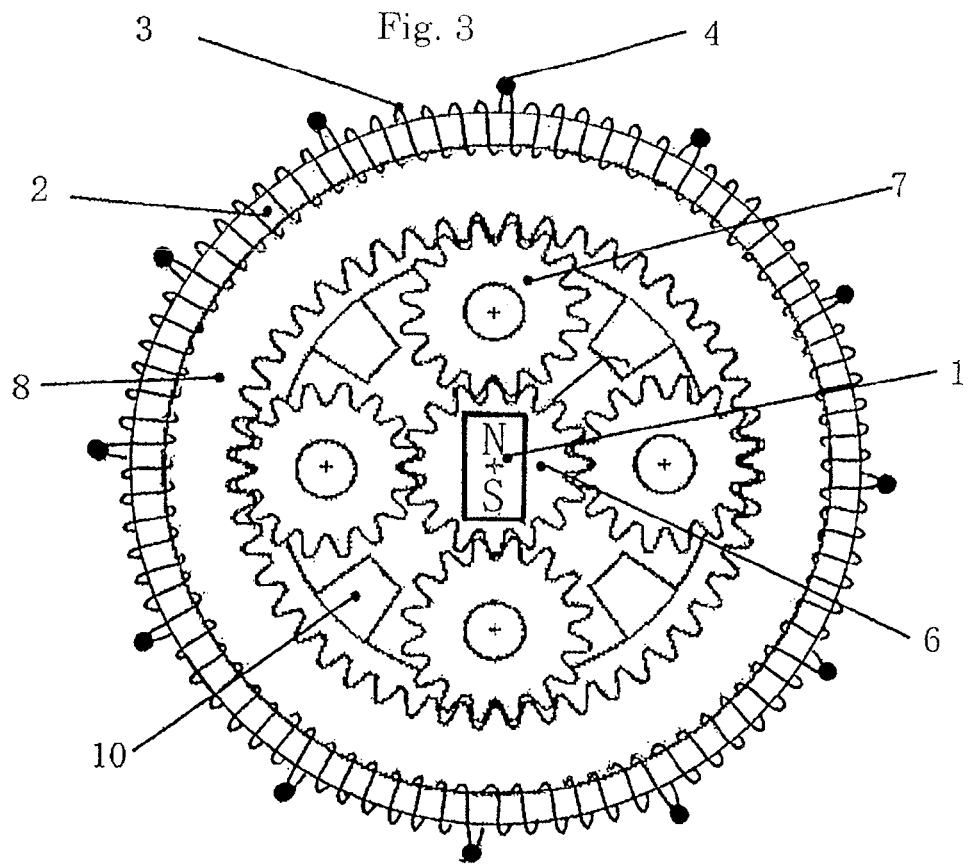
FIG. 3 is a front view of a planetary gear mechanism and the bipolar DC motor of the present invention.

FIG. 3 is a front view of a planetary geared motor of the present invention. The permanent magnet of the bipolar inner magnet rotor 1 of the present invention is provided integrally with a sun gear 6, and four planetary gears 7 mesh with and hold the sun gear 6. The number of the planetary gears 7 is shown as an example. The planetary gear 7 is held by a carrier 10 so as to be rotatable, and is held so as to be capable of orbiting by the mesh between an internal gear 8 and the planetary gear 7. As one example, twelve layer-wound toroidal coils 3 are wound around the slotless annular iron core 2 in the outer circumference of the internal gear 8, and twelve input terminals 4 are provided. The method of generating the rotational force of the sun gear 6 is the same as the method for the bipolar DC motor of the present invention.

Figure 4:
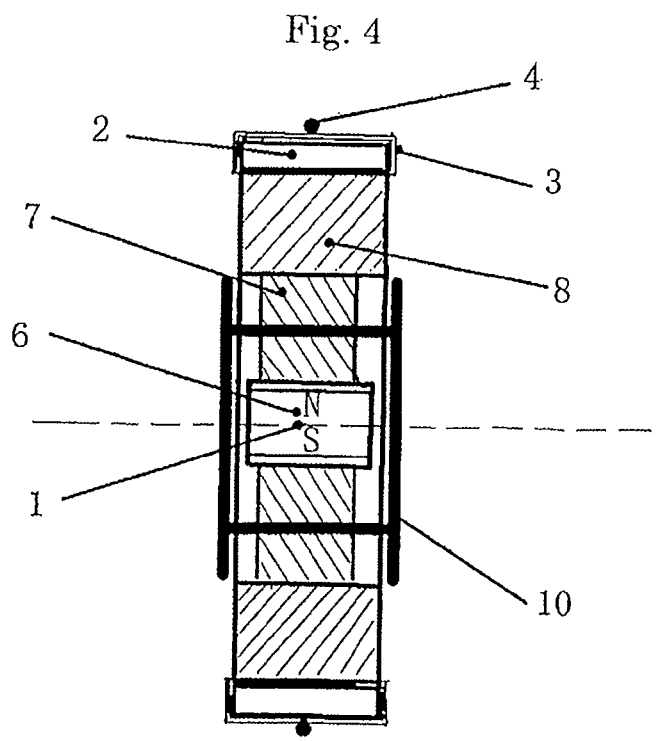
FIG. 4 is a sectional view of FIG. 3 as seen from the side.
Figure 5:
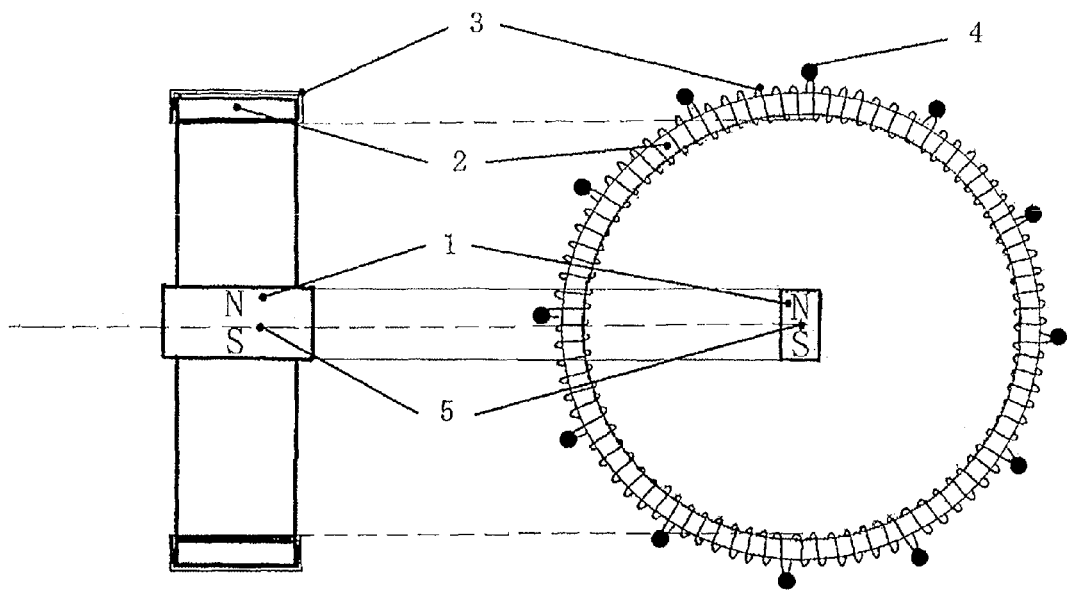
FIG. 5 shows views of the arrangement and type of a bipolar inner magnet rotor of the present invention, the left side showing a side view and the right side showing a front view.

FIG. 4 is a sectional view of the planetary geared motor of the present invention as seen from the side. As can be seen from the sectional view, the sun gear 6, the planetary gear 7, the internal gear 8, and the carrier 10 are provided by utilizing a gap, which is the feature of the bipolar DC motor of the present invention, between the armature stator, constituted of the slotless annular iron core 2 and the toroidal coil 3 as shown in FIG. 5, and the bipolar inner magnet rotor 1, whereby it is structured to be far more compact and thinner than the conventional geared motor in which a motor part and a gear mechanism part are separated.

Figure 6:
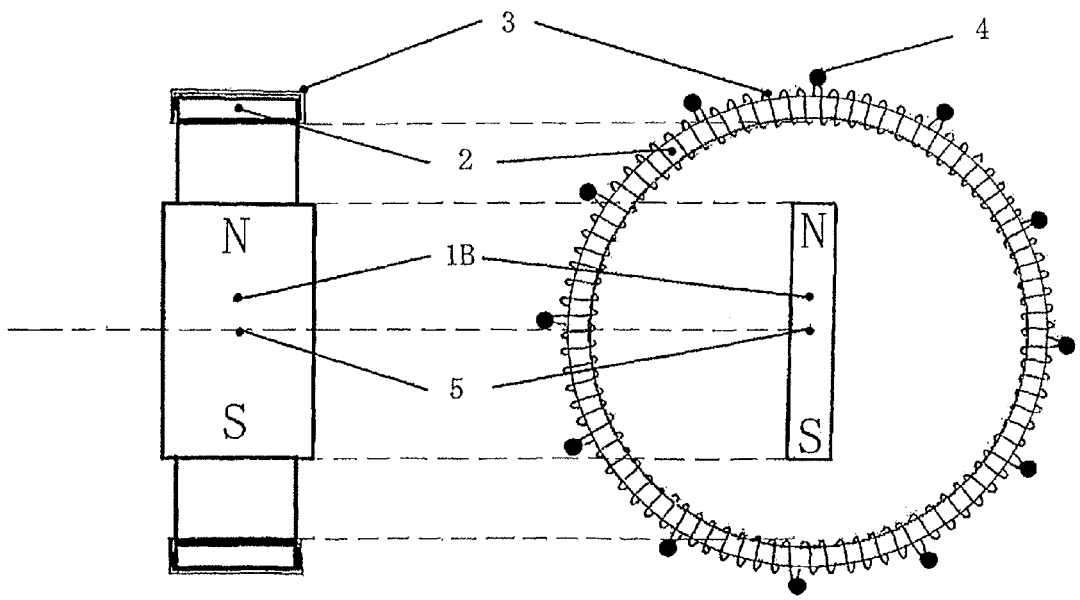
FIG. 6 shows views of the arrangement and type of the bipolar inner magnet rotor of the present invention, the left side showing a side view and the right side showing a front view.

In the a bipolar inner magnet rotor 1B of the present invention of FIG. 6, the rotation diameter between the tips of the magnetic poles has a golden section ratio relative to the inner diameter of the annular iron core 2. This is a ratio obtained from a measurement result of the influence of magnetic attraction force between the annular iron core 2 and the bipolar inner magnet rotor 1B on the rotational torque.

Figure 7:
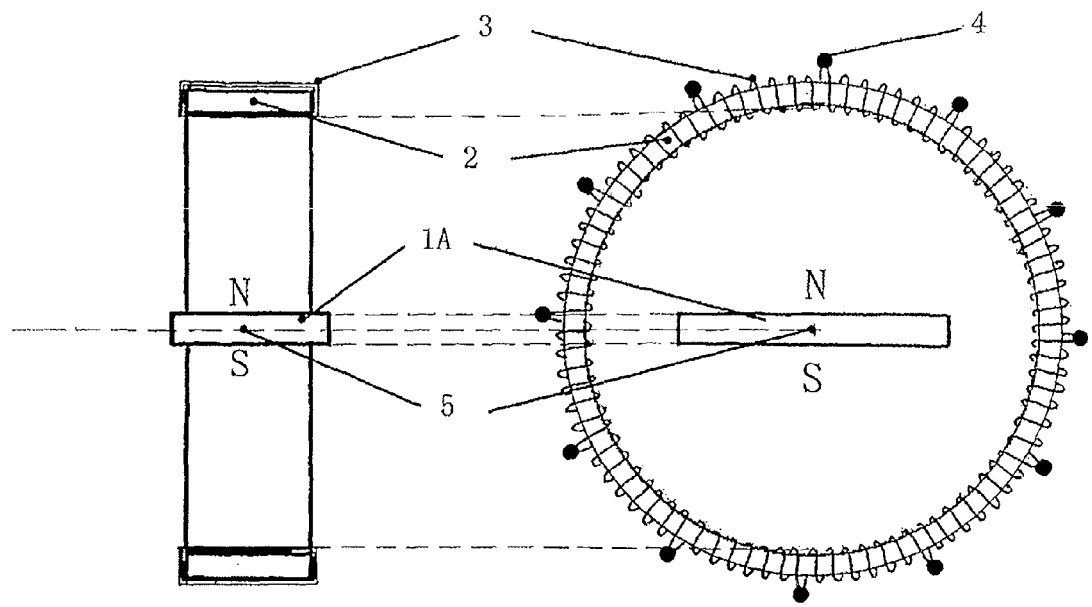
FIG. 7 shows views of the arrangement and type of the bipolar inner magnet rotor of the present invention, the left side showing a side view and the right side showing a front view.

FIG. 7 shows the bipolar inner magnet rotor 1A having a magnetic field of a plate-shaped magnet being provided with the rotation diameter having the golden section ratio described above.

Figure 8:
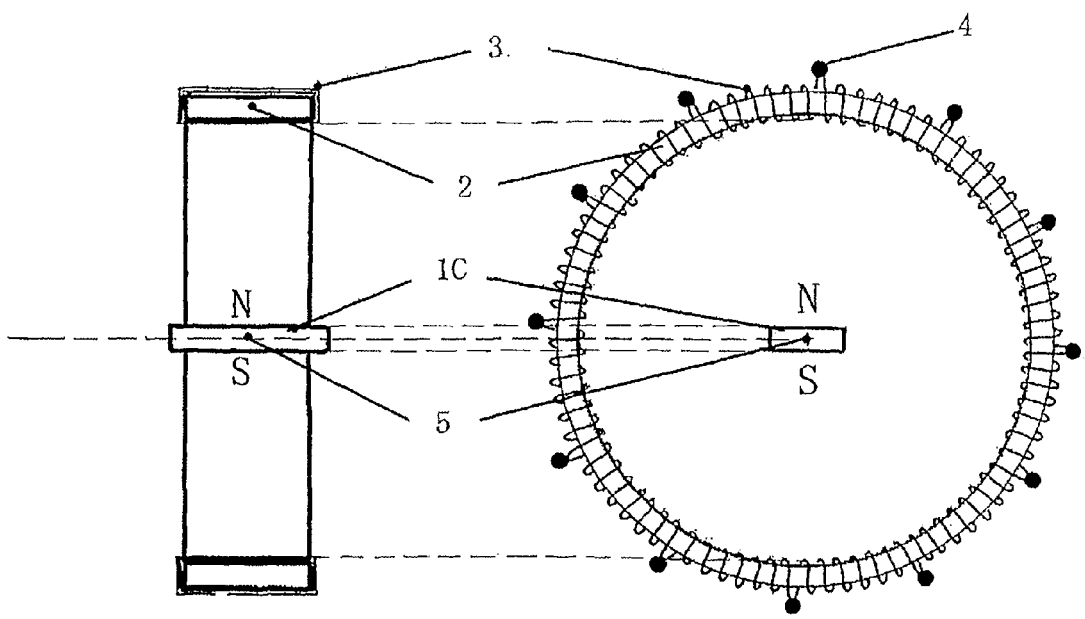
FIG. 8 shows views of the arrangement and type of the bipolar inner magnet rotor of the present invention, the left side showing a side view and the right side showing a front view.

The bipolar inner magnet rotor 1A and the bipolar inner magnet rotor 1B have larger moments of force and slower rotational speeds than the bipolar inner magnet rotor 1 and a bipolar inner magnet rotor 1C respectively shown in FIGS. 6 and 8, and therefore are suitable for use with low speed and high torque.

As an example, a rotation test was performed by applying 24 DC V to the bipolar DC motor of the present invention, in which the bipolar inner magnet rotor 1B having a magnetic field of a bar-shaped magnet shown in FIG. 6 has a rotation diameter of 80 mm and in which twelve toroidal coils 3 having 250 turns of enameled copper wire having a diameter of 0.5 mm are provided evenly around the entire circumference of the slotless annular iron core 2 having an inner diameter of 130 mm, a thickness of 10 mm, and a depth of 40 mm, by the input method shown in the descriptions of FIGS. 1 and 2 using a rotational position detection sensor and an electronic relay to apply a rotational load of 0.066 N·m to a shaft supporting the bipolar inner magnet rotor 1B. The measurement results were as follows.

The rotational load was 0.066 N·m, the rotational speed was 1400 rpm, the input electric power was 24 V and 0.45 A, and the electric power consumption was 10.8 W.

Figure 9:
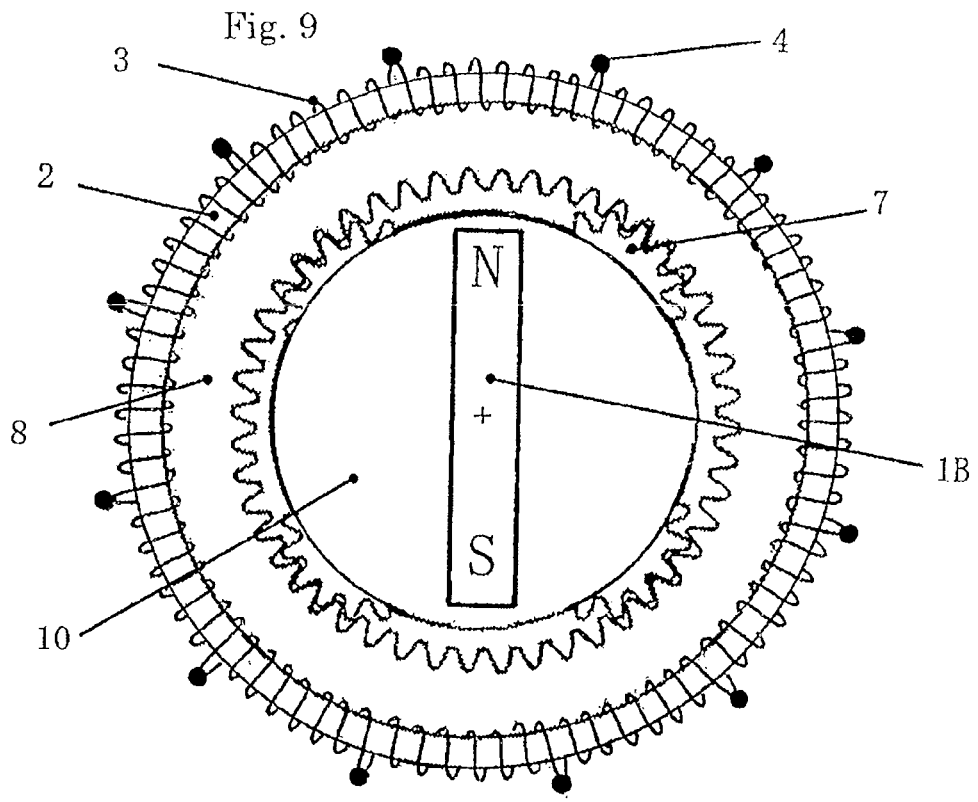
FIG. 9 is a front view of a variation of the planetary gear mechanism and the bipolar DC motor of the present invention.
Figure 10:
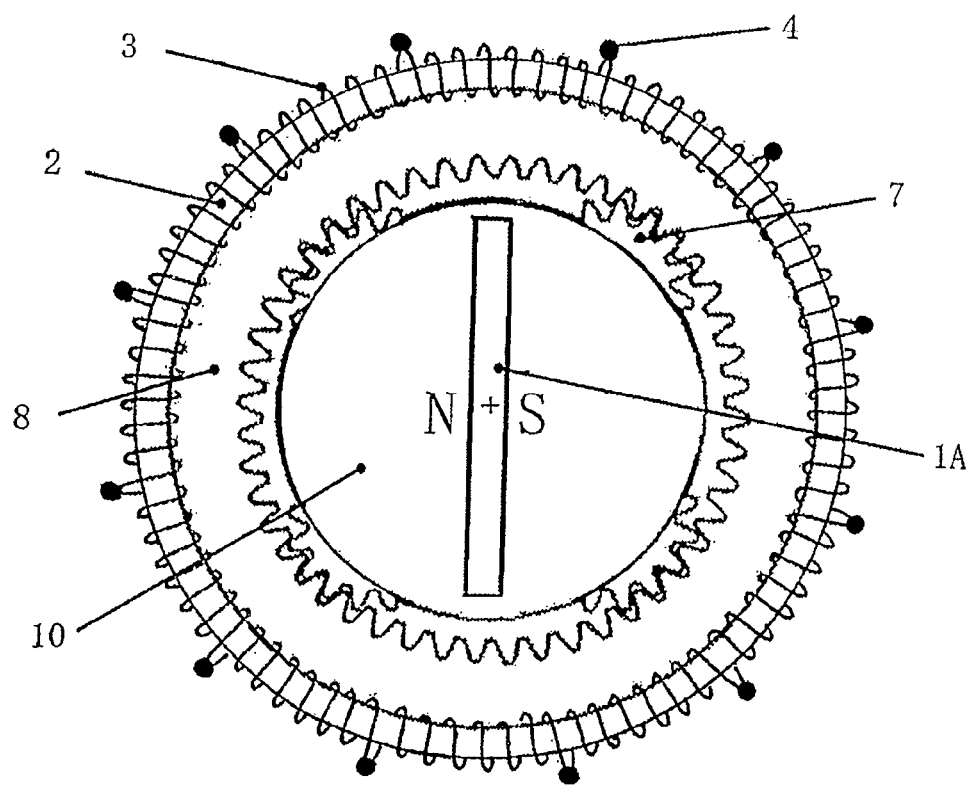
FIG. 10 is a complementary illustrative view of FIG. 9.

Thus, an example of a preferable application is a planetary gear increaser, in which the bipolar inner magnet rotor 1B or the bipolar inner magnet rotor 1A is provided integrally to a carrier of a planetary geared motor, as shown in FIGS. 9 and 10.

In FIGS. 9 and 10, a permanent magnet of the bipolar inner magnet rotor 1B or the bipolar inner magnet rotor 1A of the present invention is provided integrally with the carrier 10, and four planetary gears 7 are held. The number of the planetary gear 7 is shown as an example. The planetary gear 7 is held by the carrier 10 so as to be rotatable, and is held so as to be capable of orbiting by the mesh of the internal gear 8 and the planetary gear 7. As one example, twelve layer-wound toroidal coils 3 are wound around the slotless annular iron core 2 in the outer circumference of the internal gear 8, and twelve input terminals 4 are provided. The method of generating the rotational force of the carrier 10 is the same as the method for the bipolar DC motor of the present invention.

FIGS. 11 and 12 are views showing the bipolar inner magnet rotor 1 having a magnetic field of a bar magnet or the bipolar inner magnet rotor 1C having a magnetic field of a plate-shaped magnet, which is provided in a position eccentric with respect to center 5 of the slotless annular iron core 2.

The gap, the feature of the present invention, between the annular iron core 2 and the bipolar inner magnet rotor 1 or bipolar inner magnet rotor 1C also becomes uneven, whereby a mechanical device such as a gear formed of nonmagnetic material can be provided also in the center 5 of the armature.

As an example, a rotation test was performed by applying 24 DC V to the bipolar DC motor of the present invention, in which the bipolar inner magnet rotor 1 having a magnetic field of a bar magnet shown in FIG. 11 has a rotation diameter of 33 mm and in which twelve toroidal coils 3 having 260 turns of enameled copper wire having a diameter of 0.5 mm are provided evenly around the entire circumference of the slotless annular iron core 2 having an inner diameter of 130 mm, a thickness of 10 mm, and a depth of 40 mm, by the input method shown in the descriptions of FIGS. 1 and 2 using the rotational position detection sensor and the electronic relay to apply a rotational load of 0.033 N·m to a shaft supporting the bipolar inner magnet rotor 1. The measurement results were as follows.

The rotational load was 0.033 N·m, the rotational speed was 3300 rpm, the input electric power was 24 V and 0.50 A, and the electric power consumption was 12 W.

When the bipolar inner magnet rotor 1 or the bipolar inner magnet rotor 1C is rotated eccentrically with respect to the center 5 of the armature stator, the following application as a planetary geared motor is possible as an example.

Figure 13:
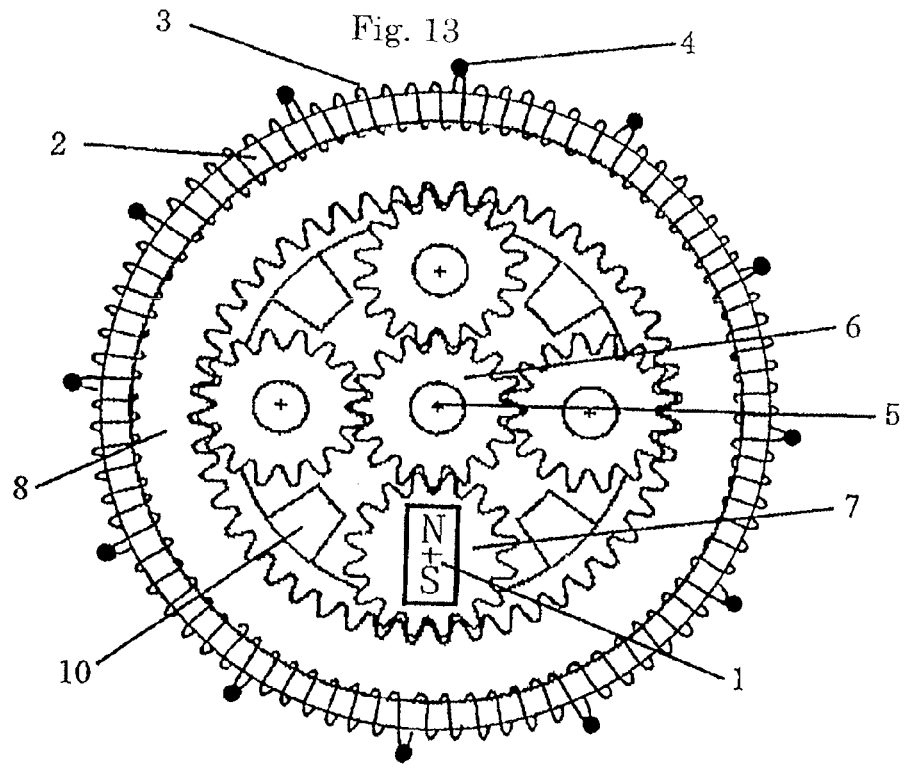
FIG. 13 is a front view of a variation of the planetary gear mechanism and the bipolar DC motor of the present invention.
Figure 14:
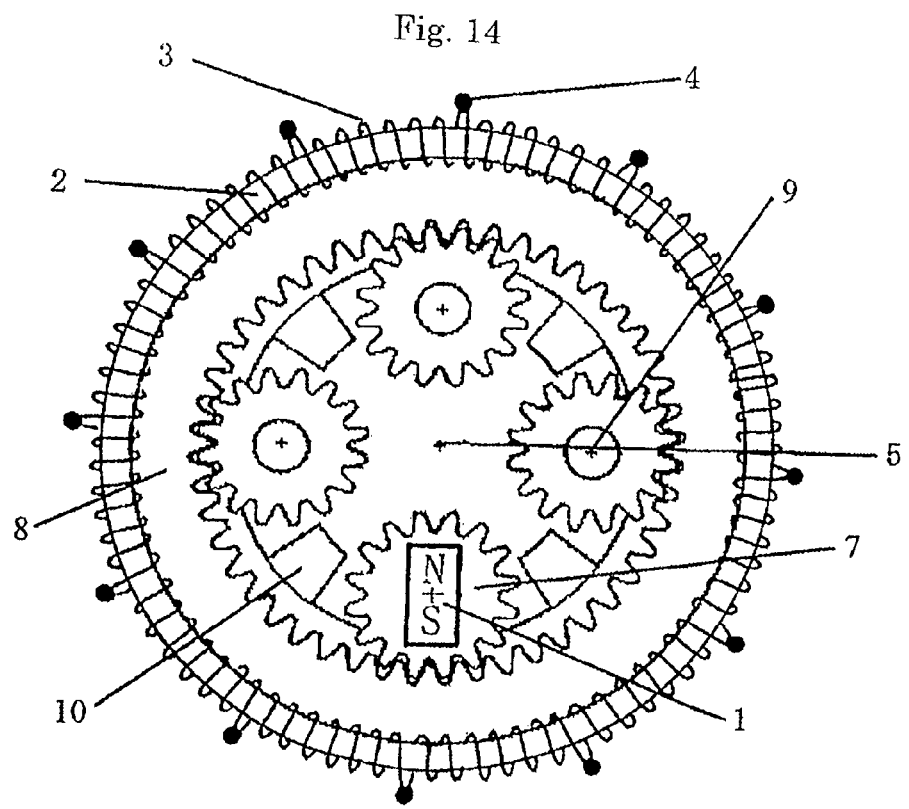
FIG. 14 is a complementary illustrative view of FIG. 13.

FIG. 13 is a view showing the bipolar inner magnet rotor 1 being provided integrally with the planetary gear 7. The planetary gear 7 is a gear which orbits while rotating. Since the bipolar inner magnet rotor 1 can be rotated even if provided in a position eccentric with respect to the center 5 of the armature stator constituted of the slotless annular iron core 2 and the toroidal coil 3, the planetary gear 7 is held by the carrier 10 to rotate and meshes with the internal gear 8 to orbit as long as the bipolar inner magnet rotor 1 is provided integrally. In this case, the sun gear 6 basically is unnecessary as shown in FIG. 14.

Figure 15:
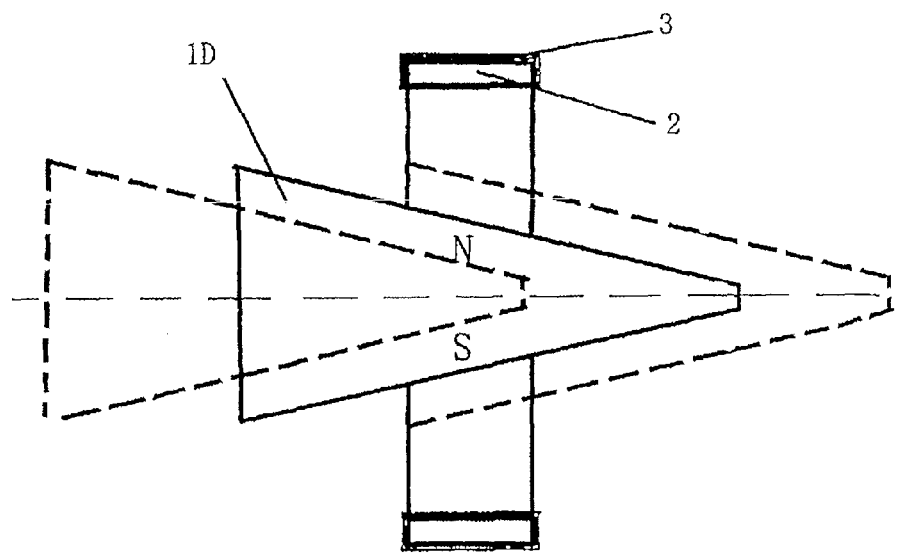
FIG. 15 is a sectional view for illustrating a variation of the operation of the bipolar inner magnet rotor.

FIG. 15 is a sectional view of the bipolar DC motor of the present invention as seen from the side. When a bipolar inner magnet rotor 1D, in which the rotation diameter changes to the rotation shaft length direction, and the armature stator constituted of the slotless annular iron core 2 and the toroidal coil 3 are relatively moved, the torque applied between the bipolar inner magnet rotor 1D and the annular iron core 2 changes, whereby the rotational speed of the bipolar inner magnet rotor 1 is varied under a constant voltage load.

As an example, a no-load rotation test of the tapered inner magnet rotor 1D was performed by applying 24 DC V to the bipolar DC motor of the present invention, in which the tapered inner magnet rotor 1D has a rotation diameter of 33 mm corresponding to that of the bipolar inner magnet rotor 1 to 80 mm corresponding to that of the bipolar inner magnet rotor 1B and in which twelve toroidal coils 3 having 250 turns of enameled copper wire having a diameter of 0.5 mm are provided evenly around the entire circumference of the slotless annular iron core 2 having an inner diameter of 130 mm, a thickness of 10 mm, and a depth of 40 mm, by the input method shown in the descriptions of FIGS. 1 and 2 using the rotational position detection sensor and the electronic relay. The measurement results were as follows.

The rotational speed varied linearly from 6000 rpm to 1830 rpm in a state where a constant input voltage of 24 V was applied.

Figure 16:
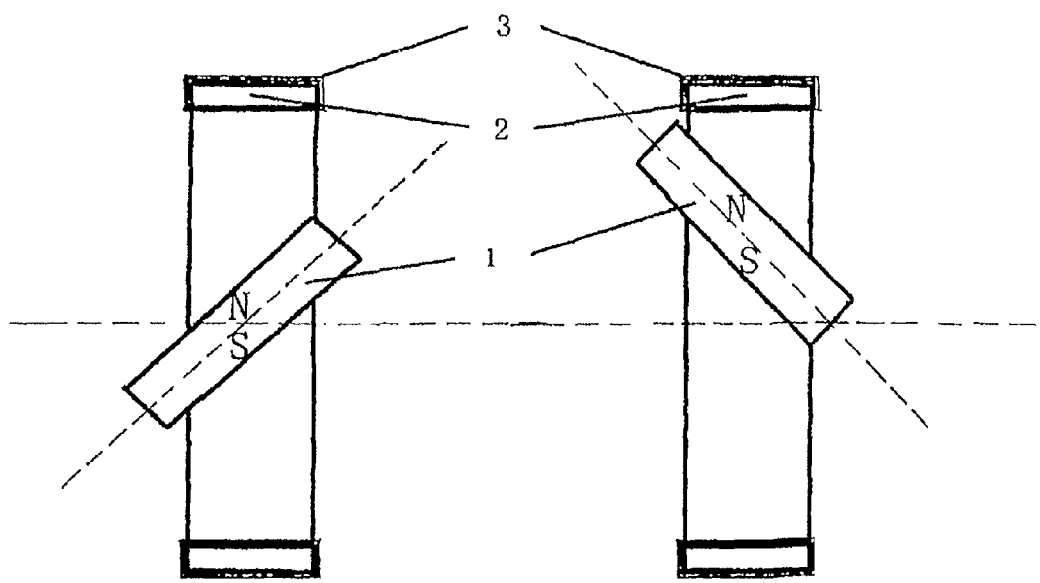
FIG. 16 is a sectional view for illustrating a variation of the operation of the bipolar inner magnet rotor.

FIG. 16 is a sectional view of the bipolar DC motor of the present invention as seen from the side. The bipolar DC motor of the present invention can be driven normally even when the rotation shaft position is varied or the angle is varied in the bipolar inner magnet rotor 1.

As an example, a driving test was performed by applying 24 DC V to the bipolar DC motor of the present invention, in which the bipolar inner magnet rotor 1 having a magnetic field of a bar-shaped magnet shown in FIG. 16 has a rotation diameter of 33 mm and in which twelve toroidal coils 3 having 250 turns of enameled copper wire having a diameter of 0.5 mm are provided evenly around the entire circumference of the slotless annular iron core 2 having an inner diameter of 130 mm, a thickness of 10 mm, and a depth of 40 mm, by the input method shown in the descriptions of FIGS. 1 and 2 using the rotational position detection sensor and the electronic relay to vary the position and the angle of a shaft supporting the bipolar inner magnet rotor 1. The measurement results were as follows.

The rotational load was 0.033 N·m, the rotational speed was 3300 rpm, the input electric power was 24 V and 0.50 A, and the electric power consumption was 12 W.

Figure 17:
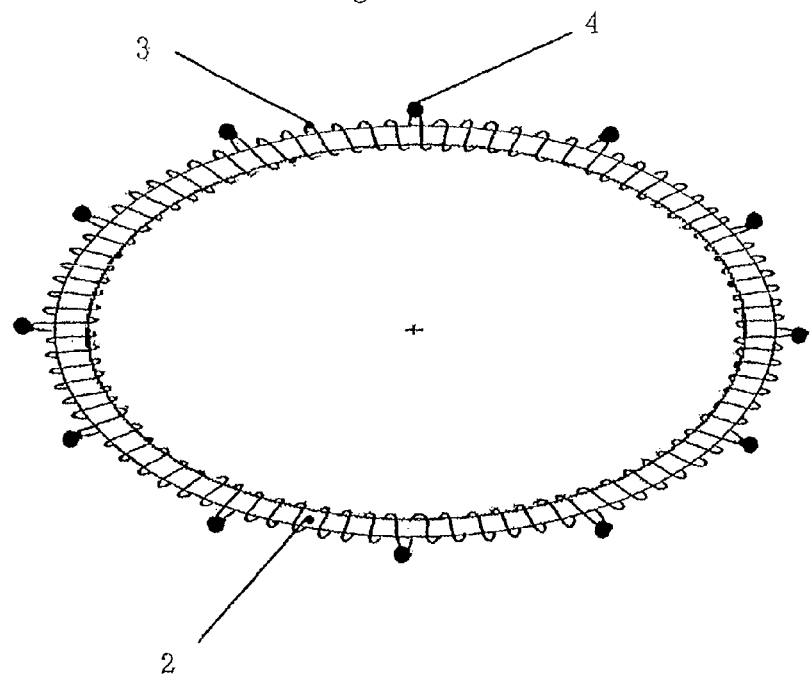
FIG. 17 is a front view of an elliptical shaped armature stator.

FIG. 17 shows an example of the shape of the armature stator of the bipolar DC motor of the present invention. The shape is an ellipse in the drawing, but may also be a polygon shape such as a triangle or a quadrangle. A total of twelve layer-wound toroidal coils 3 are provided to be wound around the entire circumference of the annular iron core 2 in the identical direction with respective rotation angles of 30 degrees as an example with respect to the center of the ellipse. Both ends of the windings of the respective toroidal coils 3 are all connected in series, and the connected portion is an input terminal 4 for electric power input.

Figure 18:
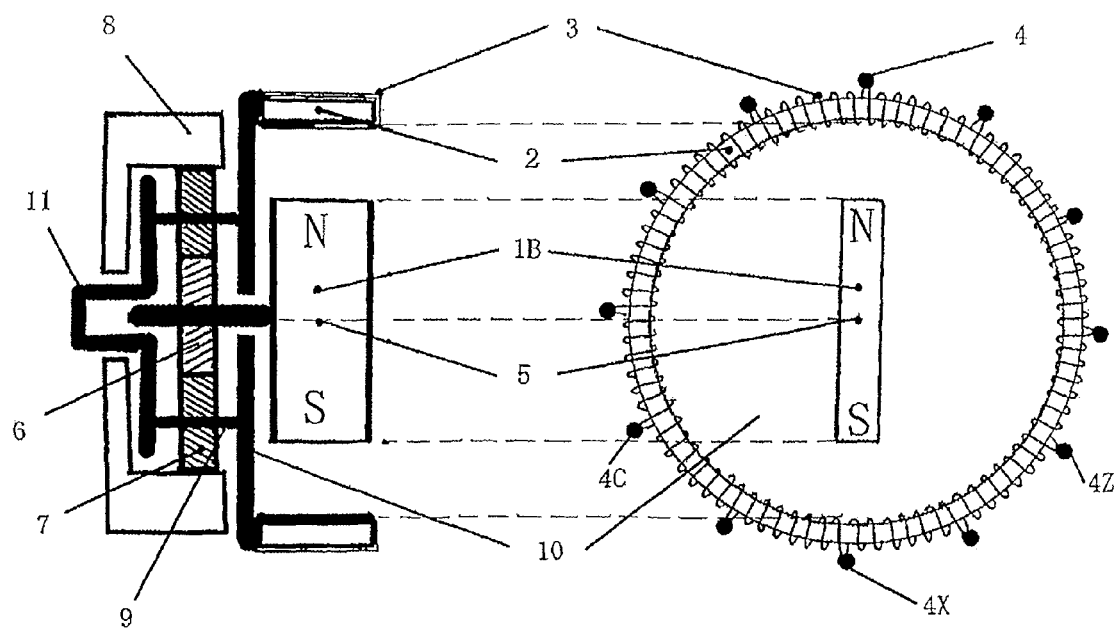
FIG. 18 show views of the configuration of a planetary geared dynamo, the left side showing a side view and the right side showing a front view.

FIG. 18 shows an example of a planetary geared dynamo as a second aspect of the present invention. As shown in FIG. 18, it is constituted of the planetary gear mechanism. The internal gear 8 is a securing gear, and the bipolar inner magnet rotor 1B is provided integrally with the sun gear 6. By externally rotating a rotation shaft 11 of the carrier 10 to which the toroidal coil 3 is integrally provided, the bipolar inner magnet rotor 1B rotates at a speed faster than the rotational speed of the toroidal coil 3 provided to the carrier 10 to generate induced electromotive force. In the case shown in FIG. 18 as an example, the bipolar inner magnet rotor 1B rotates three times in the right direction while the carrier 10 rotates once in the right direction.

When the rotation shaft 11 is rotated in the right direction, the carrier 10 transmits the torque to orbit the planetary gear 7 in the right direction, whereby the toroidal coil 3 provided to the carrier 10 and the bipolar inner magnet rotor 1B rotating integrally with the sun gear 6 rotate to the right at different speeds.

The induced electromotive force is electrically output from terminals at coil-connecting portions of the toroidal coil 3 as output terminals.

For example, referring to FIG. 18, the output is a single phase AC when the terminal 4 and the terminal 4X are used as the output terminals.

When the terminal 4, the terminal 4Z, and the terminal 4C are utilized as the output terminals, the output is a three phase AC.

The direction of the armature reaction generated at this time is, for example, the clockwise direction which is the same as the rotational direction of the magnet rotor 1B and is the same clockwise direction as the rotational direction of the carrier 10.

Regarding the output of the induced electromotive force, reverse torque in the counterclockwise direction which is in the left direction with respect to the bipolar inner magnet rotor 1B is generated, but the reverse torques cancelled by rightward torque of the carrier 10 generated by the armature reaction of the toroidal coil 3 provided integrally with the carrier 10. That is, the reverse torques reduced by generating the induced electromotive force in the toroidal coil 3 provided to the planetary gear carrier 10 using the rotation of the bipolar inner magnet rotor 1B provided to the sun gear 6 of the planetary gear mechanism, and utilizing the armature reaction generated in the carrier 10 so that the force of the armature reaction is transmitted to the sun gear 6 as positive torque.

The coil which is provided integrally with the planetary gear carrier 10 of the present invention and performs electric generation may also be an air core coil, and the magnet rotor which rotates integrally with the sun gear may also be a multipolar magnet rotor.

The reverse torque increases in direct proportion as the generated electric power increases. However, the cancelling positive torque also increases, whereby the reduction of the reverse torque by the armature reaction is effected at a constant ratio regardless of the magnitude of the output electric power.

The invention claimed is:

1. A DC motor comprising:
an armature stator including a slotless annular iron core and even numbers of coils wound around an entire circumference of the annular iron core with all the even numbers of coils being wound in an identical direction at equal intervals and rotation angles, the even numbers of coils being connected in series at both ends of all windings, and respective connection portions thereof being input terminals for electric power input; and
a bipolar inner magnet rotor having a gap formed outside a rotation diameter between tips of magnetic poles and inside an inner circumference of the annular iron core and a magnetic field of a bar-shaped magnet or a magnetic field of a plate-shaped magnet orthogonal to a rotation shaft;
wherein a DC voltage is applied to one of the input terminals of the armature stator and the input terminal in a position 180 degrees diagonal therefrom in accordance with a rotation of the bipolar inner magnet rotor in a sequential and continuous manner in a rotational direction.

2. The DC motor according to claim 1, wherein a shape of the slotless annular iron core of the armature stator is a circle shape, an ellipsis shape, a triangle shape, a quadrangle shape, or a polygon shape.

3. The DC motor according to claim 1, wherein the rotation shaft of the bipolar inner magnet rotor is eccentric with respect to a center of the shape of the slotless annular iron core.

4. The DC motor according to claim 1, wherein the rotation diameter between tips of the magnetic poles of the bipolar inner magnet rotor is changed to a rotation shaft length direction thereof.

5. A DC motor comprising:
an armature stator including a slotless annular iron core and even numbers of coils wound around an entire circumference of the annular iron core in an identical direction at equal intervals and rotation angles, the even numbers of coils being connected in series at both ends of all windings, and respective connection portions thereof being input terminals for electric power input; and
a bipolar inner magnet rotor having a gap formed outside a rotation diameter between tips of magnetic poles and inside an inner circumference of the annular iron core and a magnetic field of a bar-shaped magnet or a magnetic field of a plate-shaped magnet orthogonal to a rotation shaft;
wherein a DC voltage is applied to one of the input terminals of the armature stator and the input terminal in a position 180 degrees diagonal therefrom in accordance with a rotation of the bipolar inner magnet rotor in a sequential and continuous manner in a rotational direction, and
a ratio of a rotation magnetic pole diameter of the bipolar inner magnet rotor and an inner diameter of the slotless annular iron core is less than or equal to 61.80339%.

6. The DC motor according to claim 5, wherein a planetary gear mechanism is provided in the gap between the armature stator and the bipolar inner magnet rotor.

7. The DC motor according to claim 6, wherein the planetary gear mechanism includes a sun gear, a planetary gear meshing with the sun gear on an outer side of the sun gear, and an internal gear encompassing the planetary gear to mesh with the planetary gear, the internal gear being concentrically provided with the armature stator on an outer circumference or a side surface, and the planetary gear being integrally provided with the bipolar inner magnet rotor internally or being integrally provided with the bipolar inner magnet rotor on a side surface or including the bipolar inner magnet rotor.

8. The DC motor according to claim 6, wherein the planetary gear mechanism includes a sun gear, a planetary gear meshing with the sun gear on an outer side of the sun gear, and an internal gear encompassing the planetary gear to mesh with the planetary gear, the internal gear being concentrically provided with the armature stator on an outer circumference or a side surface, and the sun gear being integrally provided with the bipolar inner magnet rotor internally.

* * * * *